United States Patent Office 2,847,832
Patented Aug. 19, 1958

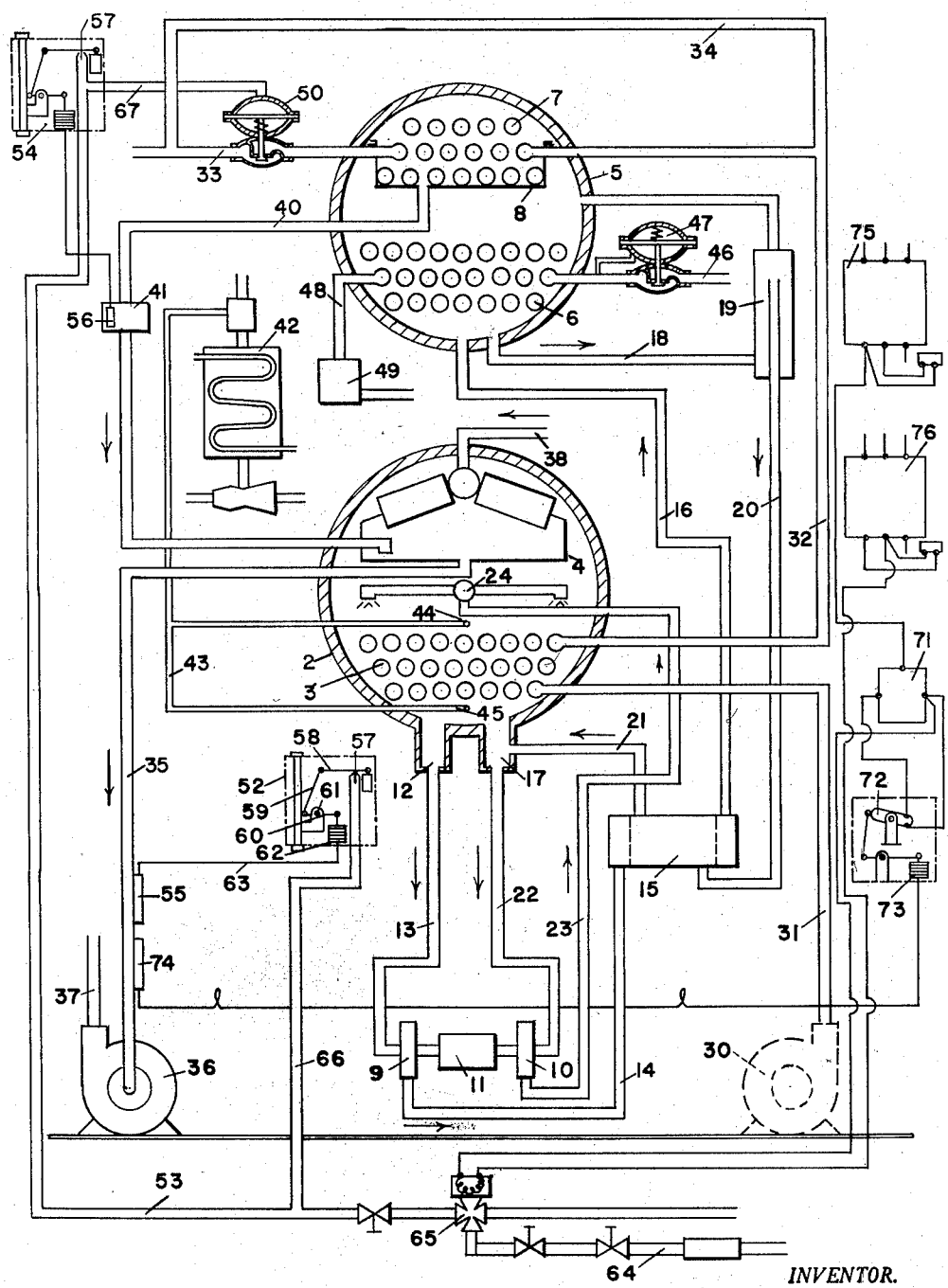

2,847,832

ABSORPTION REFRIGERATION SYSTEMS

Stuart E. Johnson, East Syracuse, N. Y., assignor to Carrier Corporation, Syracuse, N. Y., a corporation of Delaware Application May 2, 1955, Serial No. 505,368

3 Claims. (Cl. 62—101)

This invention relates to an absorption refrigeration system and more particularly to an absorption refrigeration system in which the noise created by operation of the system is greatly reduced and in which the power requirements for circulating solution in the system are reduced over systems of comparable capacity heretofore employed in the industry.

In Berestneff Patent No. 2,565,943 there is disclosed an absorption refrigeration system which has entered into extensive use. This machine includes a pump to supply weak solution from the absorber to the generator and an ejector to supply strong solution from the generator to the absorber. This arrangement frequently is noisy in operation due to flashing of absorbent in the solution line at the ejector suction; it also requires excessive power in operation since it is necessary to employ a pump of sufficient head and capacity to actuate the ejector as well as to supply weak solution to the generator. That is, the entire amount of solution handled by the pump has to be built up to a pressure sufficiently high to operate the ejector even though approximately forty percent of the flow (flow to the generator) need be built up to a pressure only slightly above atmospheric pressure. The additional head need be dissipated before the solution arrives at the generator which may be done by an orifice plate. In addition, an ejector cannot be designed satisfactorily to compensate for all load conditions. The saturated condition of the solution throughout most of the circuit upon slight disturbance in flow or pressure conditions results in flashing and noise generation. While it is possible to design an ejector which is quiet in operation, it will be appreciated such quiet operation is attained only when the impelling, discharge and suction pressures, the impelling flow, the entrained flow, and all other operating conditions are at precise design conditions. In actual operations, such conditions probably never exist so that it is necessary to employ an over-capacity ejector to meet all conditions likely to be encountered. Such ejectors are inherently noisy in operation. Hence, while a system satisfactory in operation can be constructed such system necessarily is noisy in operation to an extent frequently found objectionable.

In Reid Patent No. 2,502,104, there is disclosed an absorption refrigeration system for small capacities in which a pump is provided to supply solution to the generator from the absorber, a by-pass line being provided from the outlet of the pump to sprays in the absorber to spray solution of the same concentration as forwarded to the generator in the absorber. This is particularly undesirable in systems of large capacities since it requires continual recirculation of weak solution throughout the absorber. Weak solution, of course, has less absorptive power than strong solution hence capacity need be sacrificed to an extent which would not be feasible in systems of large tonnage. During operation, a system of this type tends to operate at higher steam temperatures and at unnecessarily high solution concentrations thus increasing the possibilities of solution solidification or crystallization.

The chief object of the present invention is to provide an absorption refrigeration system in which these disadvantages of prior systems are obviated.

An object of the present invention is to provide an absorption refrigeration system which is relatively quiet, inexpensive in operating costs and comparatively free of operating difficulties in circulating solution.

A further object is to provide a method of operation of an absorption refrigeration system which permits relatively quiet operation to be obtained and is comparatively free of operating difficulties in the circulation of solution. Other objects of the invention will be readily perceived from the following description.

This invention relates to an absorption refrigeration system which comprises in combination a generator, a condenser, an evaporator and an absorber including a flash chamber arrangement, means for supplying weak solution from the absorber to the generator, means for supplying strong solution from the generator to the flash chamber without admixture with weak solution prior to its discharge therein, strong solution flashing as it enters the chamber, the flash-cooled strong solution mixing with weak solution draining from the absorber through the chamber to form a solution of intermediate concentration while the flashed vapor is absorbed by solution being sprayed in the absorber, and means for withdrawing the solution of intermediate concentration and for supplying said solution to the absorber to absorb vapor therein to form the weak solution.

This invention further relates to a method of operation of an absorption refrigeration system including a generator, a condenser, an evaporator and an absorber having a sump-flash chamber arrangement connected thereto in which the steps consist in supplying weak solution from the absorber to the generator, supply strong solution from the generator to the flash chamber arrangement, discharging strong solution in the flash chamber arrangement thereby flash cooling the strong solution, adding the flash cooled strong solution to weak solution draining from the absorber through the chamber to form a solution of intermediate concentration, withdrawing solution of intermediate concentration, further mixing this solution of intermediate concentration, and supplying the solution to the absorber to absorb vapor therein to form weak solution.

The attached drawing is a diagrammatic view illustrating the absorption refrigeration system of the present invention.

Referring to the attached drawing, there is shown an absorption refrigeration system which includes a shell 2 containing a plurality of tubes 3 which cooperate with the shell to form an absorber. Placed in shell 2 above absorber 3 is a pan-like member 4 which cooperates with shell 2 to form an evaporator. A second shell 5 preferably is place above shell 2. Tubes 6 extend in the lower portion of shell 5 and cooperate with shell 5 to form a generator. A plurality of tubes 7 are placed in the upper portion of shell 5 to form a condenser. The tubes 7 cooperate with a pan-like member 8 to form a condenser.

A double pump arrangement is provided to circulate solution through the system as hereinafter described. This arrangement includes a pump 9 which serves to supply weak solution from the absorber to the generator and pump 10 which serves as an absorber pump. Pumps 9 and 10 are driven by a motor 11. If desired, of course, separate motors may be provided.

A sump 12 is placed in the lower part of absorber 3 and serves to collect weak solution therein. Pump 9 withdraws weak solution from sump 12 of absorber 3 through line 13. Pump 9 forwards the weak solution through line 14, heat exchanger 15 and line 16 to generator 6.

Absorber 3 includes a sump-flash chamber arrangement 17 preferably placed below the tubes of the absorber and in effect forming a portion of the shell 2.

Strong solution is withdrawn from generator 6 through line 18 to an overflow arrangement 19 which maintains a desired level of solution in generator 6. From overflow arrangement 19 strong solution passes through line 20 to heat exchanger 15 where it is placed in heat exchanger relation with weak solution flowing to the generator. From heat exchanger 15 the strong solution flows through line 21 to the sump-flash chamber arrangement 17. The strong solution upon discharge in the flash chamber is flash-cooled, the flash-cooled solution mixing with weak solution draining from the absorber through the flash chamber to form a solution of intermediate concentration. The flashed vapor so formed flows upward in the absorber and is absorbed by solution being sprayed in the absorber as hereinafter described. It will be noted it is impossible for strong solution to leave the absorber through sump 12 thus assuring that all of the strong solution is employed to form the solution of intermediate concentration and passed through the absorber at least one time before it is possible for such solution to fall in sump 12 so that weak solution only is forwarded to the generator.

Pump 10 is the absorber pump and is employed to withdraw the solution of intermediate concentration from the sump-flash chamber arrangement 17 through line 22; pump 10 forwards the solution of the intermediate concentration through line 23 to the spray arrangement 24 of the absorber. Sprays 24 serve to distribute the solution of intermediate concentration over the tubes throughout the length of the absorber. The sprayed solution of intermediate concentration absorbs refrigerant vapor and becomes weak solution. A portion of the weak solution so formed collects in sump 12 to be forwarded to generator 6 and the remainder of the weak solution so formed mixes in sump 17 with the flash-cooled strong solution to form the intermediate solution. It will be understood the strong solution upon discharge in the flash chamber 17 mixes to some extent with weak solution therein and that further mixing and cooling occurs as pump 10 forwards the mixed solution to the spray arrangement 24 so that a solution having a concentration intermediate the concentration of the strong and weak solutions is forwarded to the absorber.

Pump 30 supplies condensing water through line 31 to the tubes 3 of the absorber. The condensing water after passage through tubes 3 passes through line 32 to the tubes 7 of the condenser. Condensing water after passage through the tubes of the condenser is discharged to a cooling tower or to a drain through line 33; preferably, a by-pass line 34 is provided about the tubes 7 of the condenser extending from line 32 to line 33.

Chilled water is withdrawn from the evaporator 4 through line 35 by pump 36 and is forwarded to a place of use which may be the central station of an air conditioning system through line 37. The chilled water is returned to the evaporator through line 38 and is flash cooled in the evaporator, the flashed vapor passing to the absorber.

Condensate leaves condenser 7 through line 40 and is returned to the evaporator 4 being flash cooled in the evaporator, the flashed vapor passing to the absorber 3 as previously described. A container 41 is placed in line 40 for a purpose hereinafter described.

A suitable purge arrangement 42 is provided to remove non-condensible gases from the absorber. Purge arrangement 42 is connected to the absorber by line 43 which is attached to purge lines 44, 45 extending longitudinally of the absorber. Line 44 is placed above the tubes while line 45 is placed immediately below the tube bundle at the center of the bundle.

Steam is supplied to the tubes 6 of the generator through line 46. The usual pressure regulating valve 47 may be placed in line 46 to assure desired steam pressure in the generator. Valve 47 assures that the pressure of steam passing through the generator is controlled at a predetermined point. If desired a steam boiler control may be employed.

Steam condensate leaves the tubes of generator 6 through line 48, a steam trap 49 being provided in line 48 to assure that only condensate leaves the generator.

A normally closed pneumatic valve 50 is placed in line 33 between the tubes 7 of the condenser and the connection of by-pass line 34 with line 33. Valve 50 regulates passage of condensing water through the tubes of condenser 7. Valve 50 is actuated as hereinafter described. The by-pass 34 assures that the flow of condensing water is maintained substantially constant while permitting variation in flow of condensing water through the tubes of condenser 7.

A thermostatic control 52 regulates the pressure of air passing through branch line 53 to a second thermostatic control 54. Thermostatic control 54 in turn regulates the air pressure applied to valve 50. Thermostatic control 52 is actuated by means of a bulb 55 placed adjacent chilled water line 35. Bulb 55 reflects the temperature of chilled water which in turn indicates the load imposed upon the system. Control 54 is actuated by bulb 56 which reflects saturation temperature corresponding to pressure in shell 5. As stated above preferably bulb 56 is placed in container 41 in line 40.

Thermostats 52 and 54 are similar in design. Each includes a vent 57 adapted to be closed by flapper 58 which is supported by a lever 59 connected to an arm 60 pivoted at 61. Referring to thermostat 52 the opposite end of arm 60 is connected to a bellows 62 which forms a part of the thermal responsive system including bulb 55 being connected to bulb 55 by capillary 63.

Pressure is supplied to the controls through main air line 64. Preferably, a solenoid valve 65 or relay of suitable design is placed therein as a safety control as hereinafter described. Air passes from line 64 to line 53. Thermostat 52 is connected to line 53 by branch line 66. Pressure in branch line 53 may be regulated by thermostat 52 venting a portion of air therein to the atmosphere in accordance with the temperature of chilled water reflecting the load imposed upon the system.

Thermostat 54 has air pressure applied therein through line 53 and vents air to the atmosphere through vent 57 as determined by saturation temperature corresponding to pressure in the shell 5. Branch line 53 is also connected to valve 50 by line 67. Thermostats 52 and 54 regulate the air pressure applied to the diaphragm of valve 50.

A rotary switch 71 is provided which is connected to a mercury switch 72. Mercury switch 72 may be actuated by means of a bellows 73 and bulb 74 placed adjacent chilled water line 35. Mercury switch 72 serves in effect as a safety control. An increase in temperature of chilled water above a predetermined point opens this switch thereby closing solenoid valve 65 to prevent supply of air to controls 52, 54 and valve 50. The starters 75 and 76 actuate the motor 11 of pumps 9, 10 and the motor (not shown) of chilled water pump 36. A starter for the condensing water pump is not shown since such pump and motor are generally provided by the installer.

The control arrangement herein shown is described and claimed in the co-pending application of Louis H. Leonard, Serial No. 240,645 filed August 7, 1951, now Patent No. 2,722,805, entitled "Control Arrangement for Absorption Refrigeration Systems," and reference is made to such application for a more complete description of the control arrangement and the manner in which it appears.

The term "weak solution" is used herein to describe a solution weak in absorbing power. The term "strong solution" is used herein to define a solution strong in absorbing power.

The preferred absorbing solution is a solution of lithium bromide in water. The preferred refrigerant is water.

It is essential that both pumps 9, 10 possess adequate suction level. Inadequate suction level to pump 9 or pump 10 would create flashing and consequent noise in line 13 or line 22. Adequate suction level is first established by providing in the systems a sufficient quantity of absorbent to fill generator 6 and absorber 3 to the required level. Pump 10, the absorber pump, discharges its entire flow to spray arrangement 24. The discharge of spray arrangement 24 drains to the bottom of the absorber hence the quantity of solution contained in the absorber cannot change because of the operation of pump 10. Pump 9, the generator pump, discharges its entire flow to generator 6. Generator 6 maintains a constant level because of overflow arrangement 19. A quantity of strong solution from generator 6 substantially equal to the discharge of pump 9 (that is, the discharge of pump 9 minus the vapor boiled off in the generator) is continuously draining by forces of gravity to flash chamber 17. With substantially the same quantity of solution being supplied to the absorber and flash chamber as pumps 9 and 10 discharge from the absorber the flash chamber the absorbent level in the absorber and flash chamber will not change substantially and adequate suction level is maintained. As a result the noise level of this system is extremely low. The quantity of solution which is removed from the absorber via sump 12 equals the quantity of solution supplied to sump 17 via line 21. The flow quantity relationship between pump 9 and pump 10 can therefore be established at any desired proportion without affecting the suction level to either pump.

The flow quantity of pump 10 is comprised of a quantity of strong solution equal to the discharge flow of pump 9 minus the vapor boiled off or flashed plus a quantity of weak solution drained from the absorber.

Considering the operation of the system, pump 9 draws weak solution from sump 12 and forwards the weak solution to heat exchanger 15 where it is placed in heat exchange relation with strong solution returning to the flash chamber 17. Weak solution then passes through line 16 to the generator. In the generator, refrigerant is boiled from the solution, the refrigerant passing to tubes 7 of the condenser and being condensed thereon. Strong solution leaves the generator through line 18 and overflow arrangement 19 and is returned by forces of gravity and the pressure difference existing between the generator and the absorber through heat exchanger 15 and line 21 to the sump-flash chamber 17 of absorber 3. Discharge of strong solution within flash chamber 17 flash-cools the solution, flash-cooled solution flowing to the bottom of the chamber and mixing with weak solution therein while the flashed vapor passes upwardly to the tubes of the absorber and is absorbed by solution being sprayed over the tubes of the absorber. Strong solution due to the manner in which it is returned to the absorber cannot be forwarded to the generator assuring that only weak solution is forwarded to the generator.

Pump 10 withdraws solution from sump-flash chamber arrangement 17, pump 10 serving to further mix the solutions and to form a solution of intermediate concentration which it returns to the spray arrangement 24 of the absorber. The solution of intermediate concentration is sprayed over the tubes of the absorber and absorbs refrigerant vapor passing to the absorber from evaporator 4 as well as the flashed vapor arising through the tubes from flash chamber 17 to form weak solution a portion of which is collected in sump 12 as previously described. The remainder is collected by sump 17 and mixed with the strong solution to form the solution of intermediate concentration.

At full load, both controls 52 and 54 are effective to regulate valve 50. Valve 50 regulates flow of condensing water through the tubes 7 of the condenser.

Considering operation of the system at partial load, temperature of chilled water leaving the evaporator reduces below the control point of thermostat 54 and causes a proportionate decrease in pressure in branch line 53 since thermostat 52 is moved to an air venting position. Under normal conditions at partial load, thermostat 54 is ineffective and valve 50 may be deemed to be regulated directly by thermostat 52.

As temperature of chilled water decreases thermostat 52 regulates valve 50 to decrease the volume of condensing water passing through the tubes of condenser 7. Since the volume of condensing water passing through the tubes of condenser 7 is decreased the condenser is able to do less work, thus the condensing temperature increases. The increase in condensing temperature causes a proportionate increase in pressure in shell 5. The decrease in the work performed by the generator is caused by the decrease in the ability of the condenser to perform work so that the loading rate upon the generator is reduced resulting in the overall heat transfer being proportionately reduced with less refrigerant being boiled off. Since less refrigerant is removed from the solution in the generator the concentration of solution leaving the generator is reduced.

The arrangement provided assures that only weak solution is forwarded to the generator by pump 9. Solution level in the absorber sump 12 and in the flash chamber sump 17 is maintained by means of gravity thus eliminating any problem involved in the maintenance of sufficient head on the pumps to prevent the pumps running dry, and permitting the system to be operated without flashing of absorbent throughout the solution lines thus eliminating noise created by flashing.

The present invention provides an absorption refrigeration system in which the horsepower requirements for solution circulation have been greatly reduced and in which the noise problem due to flashing of refrigerant in solution lines has been eliminated or decreased to a minimum.

Increased flexibility of operation of an absorption refrigeration system is provided since the pump circuits are not highly susceptible to irregularities in solution flow. Pump motor speeds may be reduced because of greatly decreased head requirements resulting in quieter operation of the solution pumps and motor. Since the pumps are operated at low speeds, longer seal life results.

The present invention provides an absorption refrigeration system in which the pressure differential used to circulate the solution for any desired size of machine may be selected to permit smaller pipe sizes and a reduction in the number of spray nozzles which result in saving in initial cost of this system.

While I have described a preferred embodiment of the invention it will be understood that the invention is not limited thereto since it may be otherwise embodied within the scope of the following claims.

I claim:

1. In an absorption refrigeration system, the combination of a generator, a condenser, a shell containing an evaporator and an absorber, the absorber being placed in the shell below the evaporator to permit vapor to flow downward to be absorbed by solution in the absorber, the absorber including a plurality of tubes through which cooling medium is passed in heat exchange relation with solution and vapor exteriorly of the tubes, said absorber including a sump-flash chamber arrangement placed below the tubes and forming a portion of the shell, a pump to supply weak solution from the absorber to the generator, means for supplying strong solution from the generator to the flash chamber, strong solution flashing as it enters the chamber, the flash-cooled strong solution mixing with solution in the bottom of the chamber to form a solution of intermediate concentration while the flashed vapor is absorbed by solution being sprayed in the absorber, and a second pump connected to the flash chamber for withdrawing the solution of intermediate concentration from the chamber and for supplying said solution to the absorber to absorb vapor therein to form the weak solution.

2. An absorption refrigeration system according to claim 1 in which spray nozzles are placed in the absorber said spray nozzles being connected to the second pump and employed to discharge the solution of intermediate concentration over the tubes.

3. In a method of operation of an absorption refrigeration system including a generator, a condenser, an evaporator and an absorber having a sump-flash chamber arrangement therein and a plurality of tubes through which cooling medium is passed, the sump-flash chamber being placed below the tubes, the steps which consist in supplying weak solution from the absorber to the generator, supplying strong solution from the generator to the sump-flash chamber arrangement, discharging strong solution in the flash chamber arrangement thereby flash-cooling the strong solution, adding the flash-cooled strong solution to solution in the chamber to form a liquid solution of intermediate concentration substantially free of vapor, the flashed vapor being absorbed by solution being sprayed in the absorber, and recirculating the solution of intermediate concentration substantially free of vapor in the absorber.

References Cited in the file of this patent

UNITED STATES PATENTS

| | | |
|---|---|---|
| 1,085,624 | McKee | Feb. 5, 1914 |
| 2,430,047 | Edberg | Nov. 4, 1947 |
| 2,461,513 | Berestneff | Feb. 15, 1949 |
| 2,494,972 | Thomas | Jan. 17, 1950 |
| 2,518,180 | Reid | Aug. 8, 1950 |
| 2,518,202 | Thomas | Aug. 8, 1950 |
| 2,679,733 | Ashley | June 1, 1954 |